J. H. SHEAR.
Cooking-Stove.
No. 4,935. Reissued June 4, 1872.
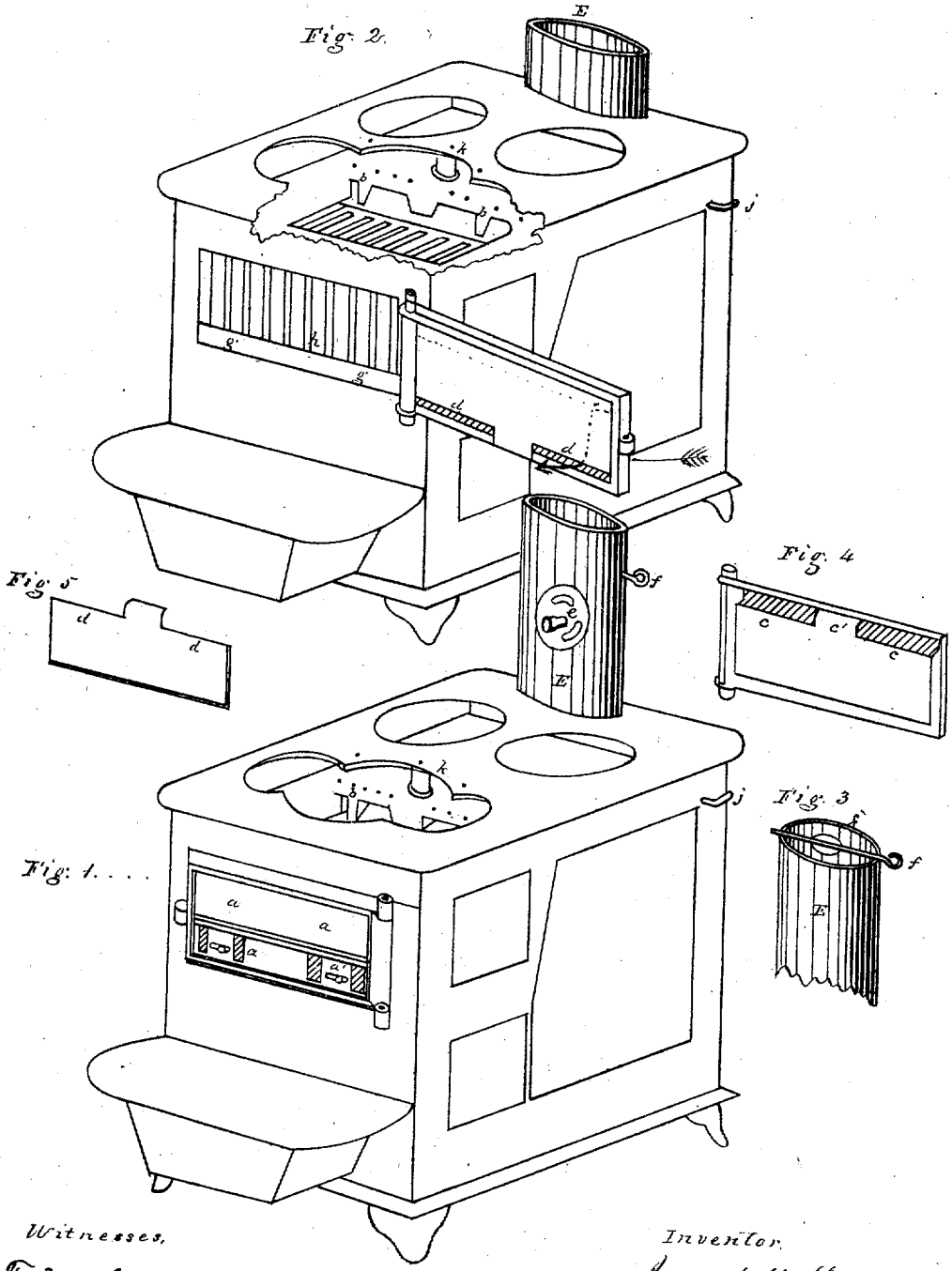
Witnesses,
T. M. Coombs
Jos. L. Coombs
Inventor,
Jacob H. Shear
By J. J. Coombs,
Attorney.
AM. PHOTO-LITHOGRAPHIC CO. N.Y. (OSBORNE'S PROCESS.)

UNITED STATES PATENT OFFICE.

JACOB H. SHEAR, OF ALBANY, NEW YORK.

IMPROVEMENT IN COOKING-STOVES.

Specification forming part of Letters Patent No. 94,658, dated September 7, 1869; reissue No. 4,935, dated June 4, 1872.

*To whom it may concern:*

Be it known that I, JACOB H. SHEAR, of the city and county of Albany and State of New York, have invented a new and useful Improvement in Cooking-Stoves; and I do hereby declare the following to be a full and exact description of said improvement, reference being had to the accompanying drawing and to the letters of reference marked thereon, the same letter always referring to the same part of the stove.

This improvement is applicable to a stove having ascending and descending flues to carry the products of combustion around the oven, and has reference to such an organization and arrangement as will tend to modify the per cent. of combustion within the fire-pot within any given time, to any desirable degree; and also to equalize the combustion in every part of the fire-pot, producing a uniform rate of combustion on every part of the grate. The first-mentioned object is accomplished by means of a chambered door to the fire-box, in passing through which the air becomes heated before reaching the fuel, and a damper in the base of the exit-flue, to check but not entirely cut off the draught. The second object is accomplished by introducing the air to the fire-box at each end of the grate, where the radiation is greatest, and excluding it from the center by means hereinafter described.

Figure 1 in the accompanying drawing is a perspective view of a stove containing my improvements with the door of the fire-box closed. Fig. 2 is a similar view with the door of the fire-box open, and a portion of the top plate broken away to show the internal structure. Fig. 3 is a view of a damper in the lower section of the escape-flue. Fig. 4 is a view of the inner side of the chambered fire-box door, with the inner plate removed to show the middle plate dividing the two chambers; and Fig. 5 is a detached view of said middle plate.

The door of the stove, *a a*, in Fig. 1, is a compound chambered door, consisting of two chambers, front and rear, connected with each other by means of flues or openings in the upper sides of the partition separating them, so located in respect to each other as that there is a closed space between them, as seen in Fig. 4, *i*. The second chamber is formed by means of a plate, *d d*, Fig. 5, so attached to the inside of the door as that the openings into the stove and under the grate shall be at the ends and on the lower side of such chamber, as seen in Fig. 2, *d d*. The manner in which the air enters these chambers is represented in Fig. 1, at the openings *a' a'*. *h* is a corrugated plate forming the front of the fire-box, below which, in the space *g g*, the air passes under the grate.

It is to be observed that this compound chambered door is so constructed that the air enters on the lower side and near the ends of first or front chamber. Thence it arises to the top of the chamber, and enters the second chamber through the openings *c c* in Fig. 4. It then descends to the bottom of the second or rear chamber and enters the stove through the openings *d d*, at the points *g g*, Fig. 2.

E is the lower section of the exit-flue, which I make of cast-iron, and which is, in fact, a part of the stove, the sheet-iron pipe connecting with it at its upper end. In this section a damper, *f*, with an orifice, *f'*, in its center is placed for checking but not wholly shutting off the draught. The orifice *f'* should be large enough to carry off the gases generated by slow combustion when the damper is closed, and to keep up a slight draught. I prefer to make it about one and a quarter inch in diameter for a damper six inches in diameter. A valve, *e*, may also be placed in the section E below the damper *f*, to let in some of the outer air; but I do not consider this essential.

It is a well-known fact that a coal fire, (especially anthracite,) may be kept alive with a much less supply of air, if the same be heated, than is requisite for that purpose when cold air is admitted to the fuel; and that the consumption of fuel will be in proportion to the draught. Hence, when cold air is introduced to the fuel the fire cannot be kept alive without draught enough to cause a rapid combustion and speedy consumption of the fuel; but when heated air only is admitted a slight draught will keep the fire alive, while the combustion and consumption of fuel will be slow.

In a stove containing my improvement, the air, entering through the chambered door, becomes more or less heated before reaching the fuel, and by closing the damper *f* the draught is almost entirely shut off; yet the fire will not go out, nor will the fuel be rapidly consumed, the chambered door and the damper *f* co-operating to produce the result of slow and long-continued combustion with a correspondingly low degree of heat.

The damper *j* is the same as ordinarily used in a three-flue stove for cutting off the ascending current in the middle flue at the top of the oven.

When it is desired to keep a moderate fire and a moderate degree of heat in the oven for a long time, as from evening until morning, or from morning until morning again, said damper *j* should be closed so as to cut off the ascending current in the middle flue and cause the heated air and products of combustion to descend in the side flues, thus keeping the oven surrounded with a moderately-heated medium. Of course it will be understood that the chambered door and the damper *f* are also to be closed, and the grate properly supplied with fuel. If the valve *e* is used, that should be opened at the same time.

It will be seen that my chambered door is so divided as to constitute two flues, *c c*, Fig. 4, with a central closed space, *c'*, between them, so that the air enters the fire-box at and near the two ends of the grate. As at the ends of the grate, where the coal comes in contact with the side plates, the radiation of caloric is much greater than at the center, where the air is admitted to the fire-box by a flue or opening extending clear across its front, the fuel will be consumed unequally, burning out in the center while it remains unconsumed at the ends of the grate. I have found by experience that my plan of introducing the air at the ends of the grate, only, completely obviates this defect, and secures an equal combustion on all parts of the grate.

Warm air may also be introduced into the fire-box at the ends of the grate by means of two flues, *b b*, air being supplied to these flues through the openings at *k*, in the top of the stove; but I do not claim this as any part of my present invention, it being embraced in a former patent granted to me; nor do I consider it important in this connection.

By thus constructing and operating my stove I find that I can keep the coal upon the grate from end to end alive with fire from eighteen to twenty-seven hours without further attention, consuming in the meantime only about twenty-five pounds of coal; whereas in cooking-stoves as heretofore constructed the fire uniformly goes out in eight or ten hours.

I have repeated experiments continuously for many weeks with uniform results, as above stated, and have thus demonstrated the practical value of my said improvements, and that the said chambers, flues, and dampers co-operate to produce the described results.

It is manifest that the heating-chambers through which the air passes to enter the fire-box may be placed in the front or sides of the stove instead of the door without changing the principle of operation.

Having thus fully described my invention, what I claim as new, and desire to secure by Letters Patent, is—

In a cooking-stove of the general construction and arrangement described, I claim the chambered door, grate, flues, dampers *j* and *f*, and exit-pipe, under the combination substantially as represented and described.

Witnesses: JACOB H. SHEAR.

JOS. L. COOMBS,

T. M. COOMBS.